March 1, 1927.

E. R. HELLER 1,619,725

COMBINATION FOOT REST AND ROBE CONTAINER

Filed April 23, 1923   2 Sheets-Sheet 1

Earl R. Heller — INVENTOR

BY Victor J. Evans
ATTORNEY

WITNESSES

March 1, 1927.  
E. R. HELLER  
1,619,725  
COMBINATION FOOT REST AND ROBE CONTAINER  
Filed April 23, 1923   2 Sheets-Sheet 2
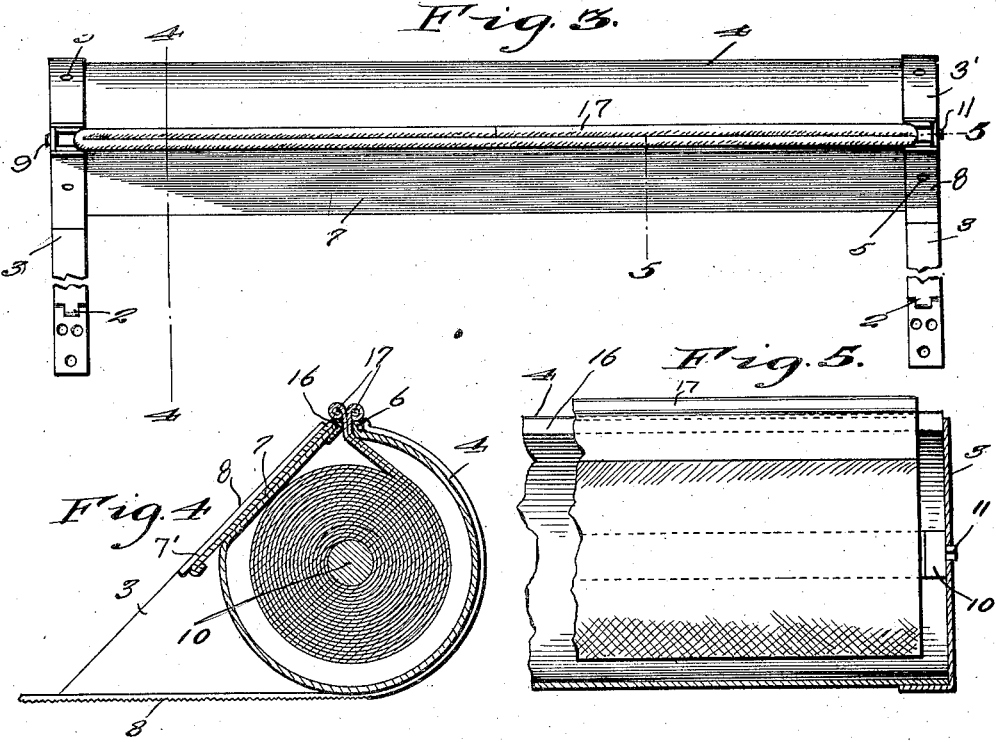
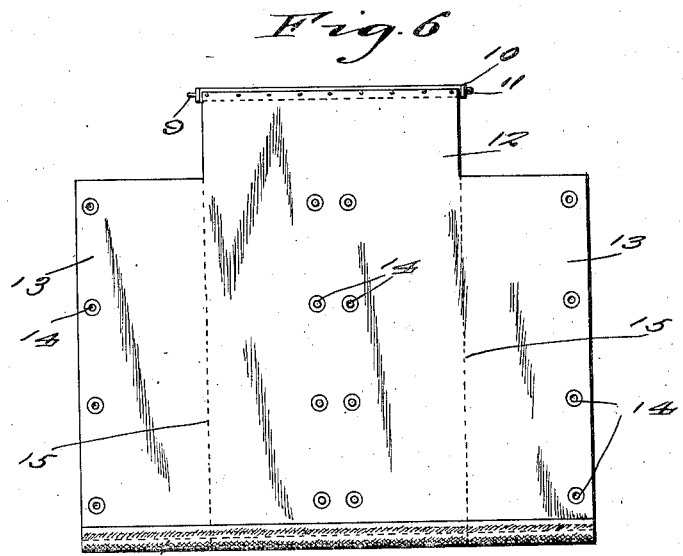
Earl R. Heller INVENTOR
BY Victor J. Evans
ATTORNEY Patented Mar. 1, 1927.

1,619,725

UNITED STATES PATENT OFFICE.

EARL R. HELLER, OF WAPWALLOPEN, PENNSYLVANIA.

COMBINATION FOOT REST AND ROBE CONTAINER.

Application filed April 23, 1923. Serial No. 634,146.

This invention has reference to a combined foot rest and robe holder for vehicles, such as automobiles or the like.

The object is to hingedly secure to the bottom of a vehicle a casing having a spring wound robe therein, and having an angle face to provide a foot rest, the robe being readily withdrawn from the casing to protect the occupants of the vehicle and automatically rolled in the casing when not desired for use, and the said casing being susceptible to swinging against the seat of the vehicle when neither the robe nor the foot rest are required for use.

A further object is to produce a combined foot rest and robe holder for vehicles, such as automobiles or the like, in which the robe is secured on a spring influenced roll in a casing that is fixed to the floor of the vehicle, so that the possibility of stealing of the robe will be obviated.

A further object is to produce, in combination with a combined foot rest and robe holder, a robe of a particular construction, foldable to permit of its ready passage into or its withdrawal from a casing and susceptible to spreading to fully protect the occupants when in use.

To the attainment of the foregoing, the invention consists in the improvement as hereinafter described and definitely claimed.

In the drawings:—

Figure 3 is a plan view of the device as illustrated in Figure 1 with the robe arranged in the casing.

Figure 4 is a sectional view on the line 4—4 of Figure 3.

Figure 5 is a sectional view on the line 5—5 of Figure 3.

Figure 6 is a plan view of the robe in extended position.

Figure 1:
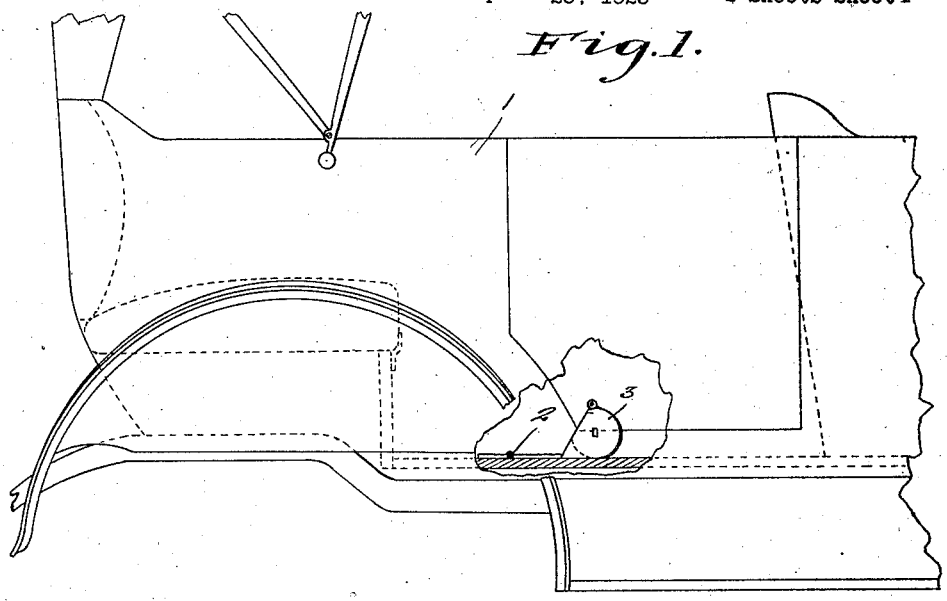
Figure 1 is a sectional view of a sufficient portion of an automobile to illustrate the application of the improvement.

Referring now to the drawings in detail, the numeral 1 designates a portion of a vehicle, such as an automobile, to illustrate the application of my invention thereon.

To the floor in the tonneau of the automobile, I hinge as at 2, the removable side members 3, of a casing 4. Each side 3 comprises a flat body portion whose rear end is rounded, and whose forward end is inclined from its bottom to its top. The rounded rear and bottom portion of each of the sides is flanged inwardly, as indicated by the numeral 3', and the angle outer edge, at the top of each of the sides is also formed with an inwardly extending flange 8 which is spaced from the rounded flange 3'. The flange providing the base of each of the sides may have its under face corrugated, as at 8', for frictional engagement with the floor of the vehicle. The base flanges of the sides are hingedly connected, as at 2, to bracket plates 2' which are secured to the floor of the vehicle.

The casing 4 is in the nature of a split tube whose outer face, however, is arranged at an angle, as indicated by the numeral 7, and this angle portion is designed to be received between the flanges 8 of the sides 3 when the body of the casing proper is received in the flanges 3'. Suitable removable securing means 5 pass through the flanges of the sides for sustaining the casing thereon. The angle portion 7 of the casing 4 provides a foot rest, and there may be arranged over the said portion and under the flanges 8 of the sides 3 a plate 7', as disclosed in Figure 4 of the drawings.

The edges of the split tube are preferably rolled, as at 6 to provide the same with a beaded mouth.

One of the sides 3 is provided with a centrally round opening, the other with a rectangular opening. The first mentioned opening receives therethrough the rounded pimple 9 on one end of the spring influenced roller 10, the other opening receiving therethrough the rectangular end of the spring shaft 11, for the roller. The roller is held from accidental turning by the usual means, the said roller being of the class or character usually employed in connection with window shades.

The robe has a reduced end 12, which is fixedly secured on the roller 6, the lateral extensions beyond said end being in the nature of foldable flaps 13, there being suitable securing means 14 between the flaps and the body of the robe, the same being preferably in the nature of the usual head and socket fasteners. Also preferably side flaps 13, while integrally formed with the body of the robe are stitched, as at 15, along their fold lines. This greatly assists the operator in arranging the flaps over and fastening the same to the body of the robe, so that the fold lines will be approximately in a line with the edges of the end or extension 12, and will be in proper position to be received through the mouth 16 of the casing provided by the space between the rolled end 6 and the plate forming end thereof. The outer end of the robe is folded and stitched around a fabric reinforcement 17. The reinforcement may be in the nature of a rolled cloth, strands of rope or other suitable material and provides a gripping surface whereby the curtain can be readily withdrawn from the casing, the gripping end of the robe being disposed in the mouth of the casing and slightly projecting therefrom.

Figure 2:
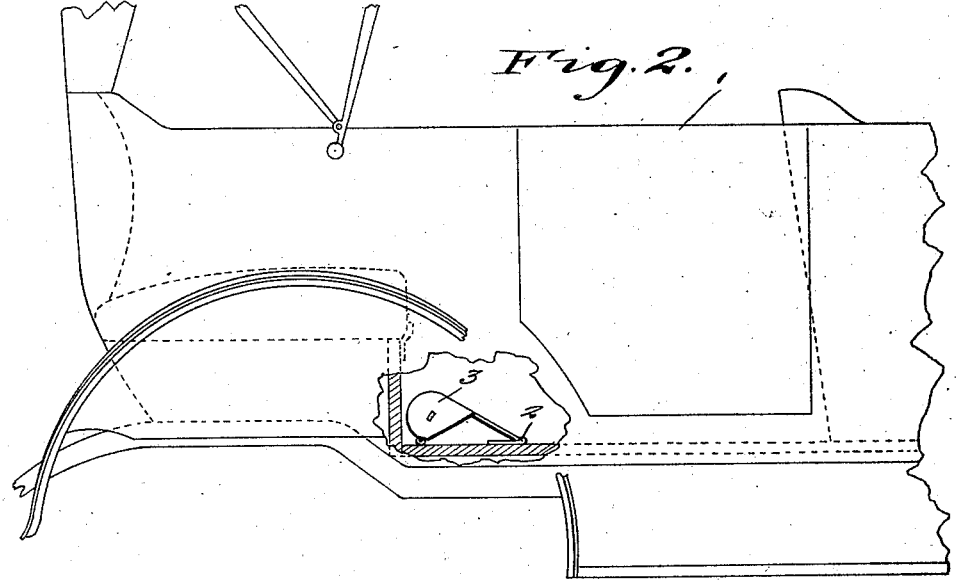
Figure 2 is a similar view showing the casing swung against the seat.

When the device is not needed either as a foot rest or a robe, the same may be swung upon its hinges against the front of the rear seat of the automobile as illustrated in Figure 2 of the drawings.

While I have illustrated the satisfactory embodiment of my improved device, my features of the invention are capable of extended application and I do not wish to be restricted to the specific structure shown and described.

Having thus described my invention what I desire to claim as new is:—

A device for the purpose set forth, comprising side plates which are hingedly supported, each of said plates having its free end portion widened to provide a rounded outer end and an inner flanged edge, both of which are flanged inwardly, a split tubular body received in the flanges of the sides, said body having an angle portion designed to align with the angle edges of the sides, removable securing means passing through the sides for sustaining the spilt tubular body thereon, said body designed for the reception of a lap robe whose end projects through the split portion thereof, and the body as a whole susceptible for swinging to provide a foot rest when the lap robe is not in use and likewise susceptible for swinging away to a second position to permit of the angle face of the body serving as a foot rest and to likewise permit of the withdrawing of the robe from the body.

In testimony whereof I affix my signature.

EARL R. HELLER.